(12) United States Patent
Zhuang et al.

(10) Patent No.: US 8,121,282 B1
(45) Date of Patent: Feb. 21, 2012

(54) CALL PARK/RETRIEVE USING SIP

(75) Inventors: Jiahe Zhuang, Allen, TX (US); Liang Wu, Frisco, TX (US); Henry Chen, Plano, TX (US); Michael H. McClung, Ruckersville, VA (US); Jeffery Sanders, Cocoa, FL (US)

(73) Assignee: Cisco Technology, Inc., San Jose, CA (US)

( * ) Notice: Subject to any disclaimer, the term of this patent is extended or adjusted under 35 U.S.C. 154(b) by 1342 days.

(21) Appl. No.: 11/788,850

(22) Filed: Apr. 19, 2007

(51) Int. Cl.
*H04L 12/28* (2006.01)
(52) U.S. Cl. .................... 379/351; 379/211.02; 709/238
(58) Field of Classification Search ................. 370/351, 370/357; 379/211.02; 709/238
See application file for complete search history.

(56) References Cited

U.S. PATENT DOCUMENTS

| | | | |
|---|---|---|---|
| 5,742,596 A | 4/1998 | Baratz et al. | |
| 6,473,437 B2 | 10/2002 | Stumer | |
| 6,577,622 B1 * | 6/2003 | Schuster et al. | 370/352 |
| 7,280,533 B2 * | 10/2007 | Khartabil et al. | 370/352 |
| 7,417,988 B1 * | 8/2008 | Tripathi et al. | 370/389 |
| 7,555,555 B2 * | 6/2009 | Park et al. | 709/227 |
| 7,647,374 B2 * | 1/2010 | Rajahalme et al. | 709/204 |
| 7,738,644 B2 * | 6/2010 | Brannick et al. | 379/212.01 |
| 7,808,928 B2 * | 10/2010 | Kim et al. | 370/255 |
| 7,940,792 B2 * | 5/2011 | Raghav et al. | 370/466 |
| 2004/0240656 A1 | 12/2004 | Poustchi | |
| 2006/0093115 A1 | 5/2006 | Chen et al. | |

OTHER PUBLICATIONS

J. Rosenberg, et al., "SIP: Session Initiation Protocol", Jun. 2002, Network Working Group, Request for Comments: 3261, 252 pages.
A. Niemi, Ed., "Session Initiation Protocol (SIP) Extension for Event State Publication", Network Working Group, Request for Comments: 3903; Oct. 2004, 30 pages.

\* cited by examiner

*Primary Examiner* — Creighton Smith
(74) *Attorney, Agent, or Firm* — Fish & Richardson P.C.

(57) ABSTRACT

In one embodiment, a method can include: when performing a park operation: (i) receiving a first message from a park call phone; (ii) providing a second message having a park code to the park call phone; and (iii) receiving a third message having call information from the park call phone; and when performing a retrieve operation: (iv) receiving a fourth message having the park code from a retrieve call phone; (v) providing a fifth message having the call information to the retrieve call phone; (vi) forwarding a sixth message having the park code from the retrieve call phone to a parked device; (vii) forwarding a seventh message from the parked device to the retrieve call phone; and (viii) receiving an eighth message having the park code from the retrieve call phone.

19 Claims, 7 Drawing Sheets

CALL PARK/RETRIEVE USING SIP

TECHNICAL FIELD

The present disclosure relates generally to approaches for parking/retrieving a call using session initiation protocol (SIP).

BACKGROUND

In distributed session initiation protocol (SIP) call processing environments, managing call parking may provide design challenges. For example, locating and retrieving a parked call, managing parking calls, and park code allocation/reallocation in a distributed SIP environment may be difficult using conventional approaches.

In one conventional approach, extensions to SIP for event state publication can be utilized, as found in IETF (Internet Engineering Task Force) RFC 3903. SIP is also an IETF standard (RFC 3261). All relevant portions of both RFC 3261 and RFC 3903 are incorporated by reference herein.

DESCRIPTION OF EXAMPLE EMBODIMENTS

Overview

Figure 1:
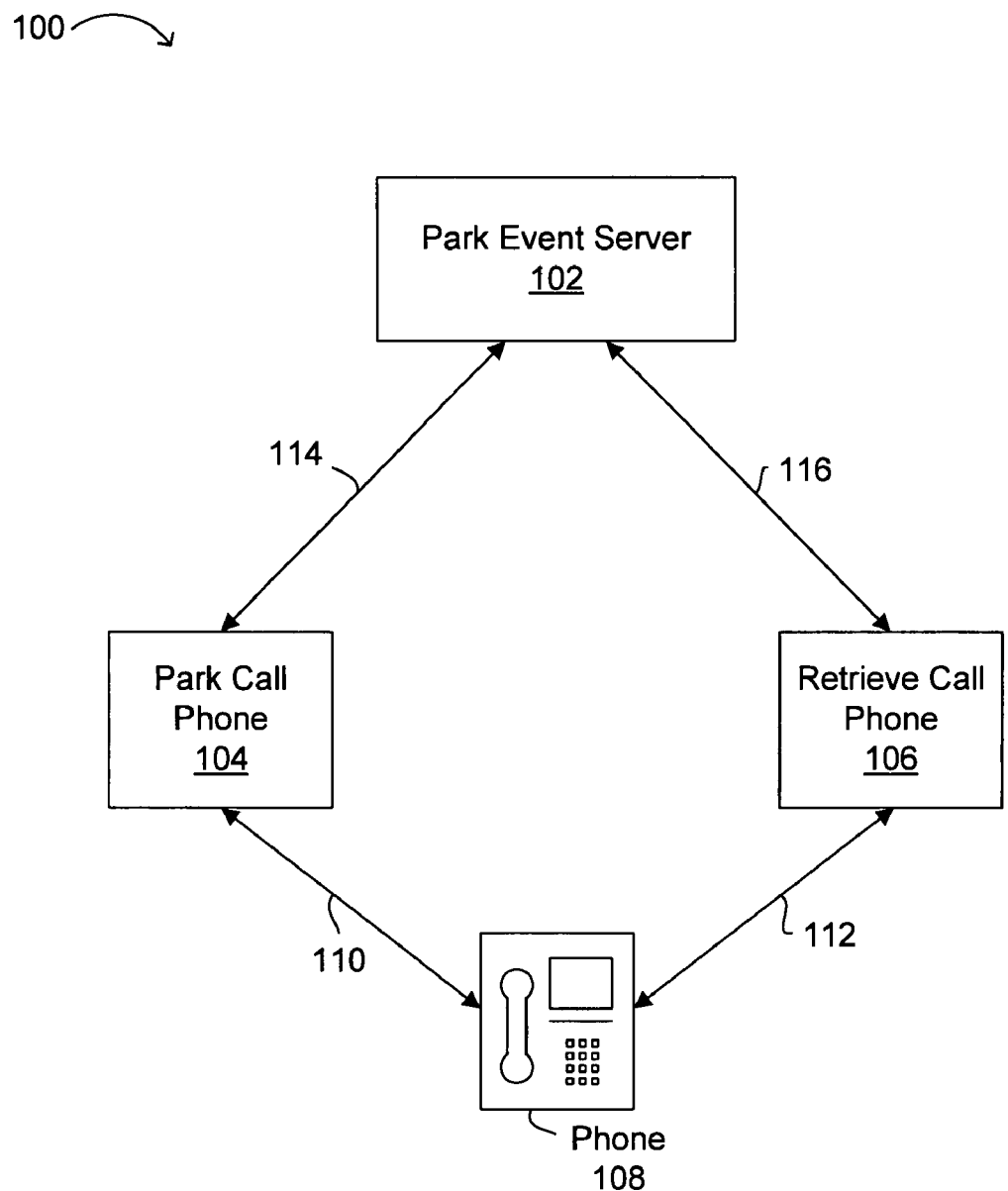
FIG. 1 illustrates an example park-retrieve phone system.

In one embodiment, a method executed by a park event server for performing a park operation can include: (i) receiving a first message from a park call phone; (ii) providing a second message having a park code to the park call phone; and (iii) receiving a third message having call information from the park call phone.

In one embodiment, a method executed by a park event server for performing a include: retrieve operation can include: (i) receiving a first message having a park code from a retrieve call phone; (ii) providing a second message having call information to the retrieve call phone; (iii) forwarding a third message having the park code from the retrieve call phone to a parked device; (iv) forwarding a fourth message from the parked device to the retrieve call phone; and (v) receiving a fifth message having the park code from the retrieve call phone.

In one embodiment, an apparatus can include a park event server having an interface coupled to a park call phone such that, when performing a park operation, the park event server can: (i) receive a first message from the park call phone; (ii) provide a second message having a park code to the park call phone; and (iii) receive a third message having call information from the park call phone.

In one embodiment, an apparatus can include a park event server having an interface coupled to a retrieve call phone such that, when performing a retrieve operation, the park event server can: (i) receive a first message having a park code from the retrieve call phone; (ii) provide a second message having call information to the retrieve call phone; (iii) forward a third message having the park code from the retrieve call phone to a parked device; (iv) forward a fourth message from the parked device to the retrieve call phone; and (v) receive a fifth message having the park code from the retrieve call phone.

Example Embodiments

In particular embodiments, when call park has been invoked (e.g., using a provider edge device or customer premise equipment (CPE), such as a Linksys solution), the park feature on the edge device may try to reserve a park code from the park server by using a session initiation protocol (SIP) subscribe. Once the park server receives a park code reservation request, the server can allocate and reserve a park code, and provide a response using the SIP notify message, that can include the park code. Further, distributed party call control (DPCC) can be employed in particular embodiments to leverage a standard SIP message (e.g., INVITE or RE-INVITE), and allow retrieval.

After the park feature on the edge device receives the response, the edge device (e.g., a park call phone) may park and hide the call. Then, the call information can be published from the edge device to the park event server (e.g., by using SIP publish). A user can then dial the park code on any edge device (e.g., a retrieve call phone) to retrieve the call. When the park code is being dialed, a retrieve feature can send the SIP subscribe event to the park server to fetch call information. Once a response is received from the park event server, the edge device may use DPCC services to retrieve the call from any phone. After the call has been successfully retrieved, the retrieve event may be published to the park server (e.g., by using SIP publish) to clear the call information and reallocate the park code on the park server for future use. In this fashion, any phone can enter a park code and retrieve an associated call.

Referring now to FIG. 1, an example park-retrieve phone system is shown and indicated by the general reference character 100. For example, system 100 can represent any SIP-based phone system. Park event server 102 can interface via 114 to park call phone 104, and via interface 116 to retrieve call phone 106. Also, phone 108 can interface via 110 to park call phone 104, and via 112 to retrieve call phone 106. Interface 114 can include SIP subscribe and publish messages sent from park call phone 104 to park event server 102, as well as SIP notify messages sent from park event server 102 to park call phone 104.

Interface 116 can include the SIP notify message being sent from park event server 102 to retrieve call phone 106, as well as SIP subscribe and publish messages returned from retrieve call phone 106 to park event server 102. Interface 110 can include a connected call indication between park call phone 104 and phone (e.g., parked device) 108. In addition, interface 112 can include SIP re-invite and acknowledge messages from retrieve call phone 106 to phone 108, as well as SIP OK (e.g., 200 OK) from phone 108 to retrieve call phone 106. Structures and/or operation within example park call phone 104 and example retrieve call phone 106 will be discussed in more detail below with reference to FIGS. 3 and 4, respectively.

Generally, the SIP subscribe/notify approach may be utilized to deliver a park code to park event server 102, where the park event server can maintain the status or state of parked calls, and may further change the state of these calls based upon notifications received from parking (e.g., 104) or retrieving (e.g., 106) devices. As such, a park event server may maintain the state of a parked call, and also the state of a unique reservation identifier throughout a park session.

Figure 2:
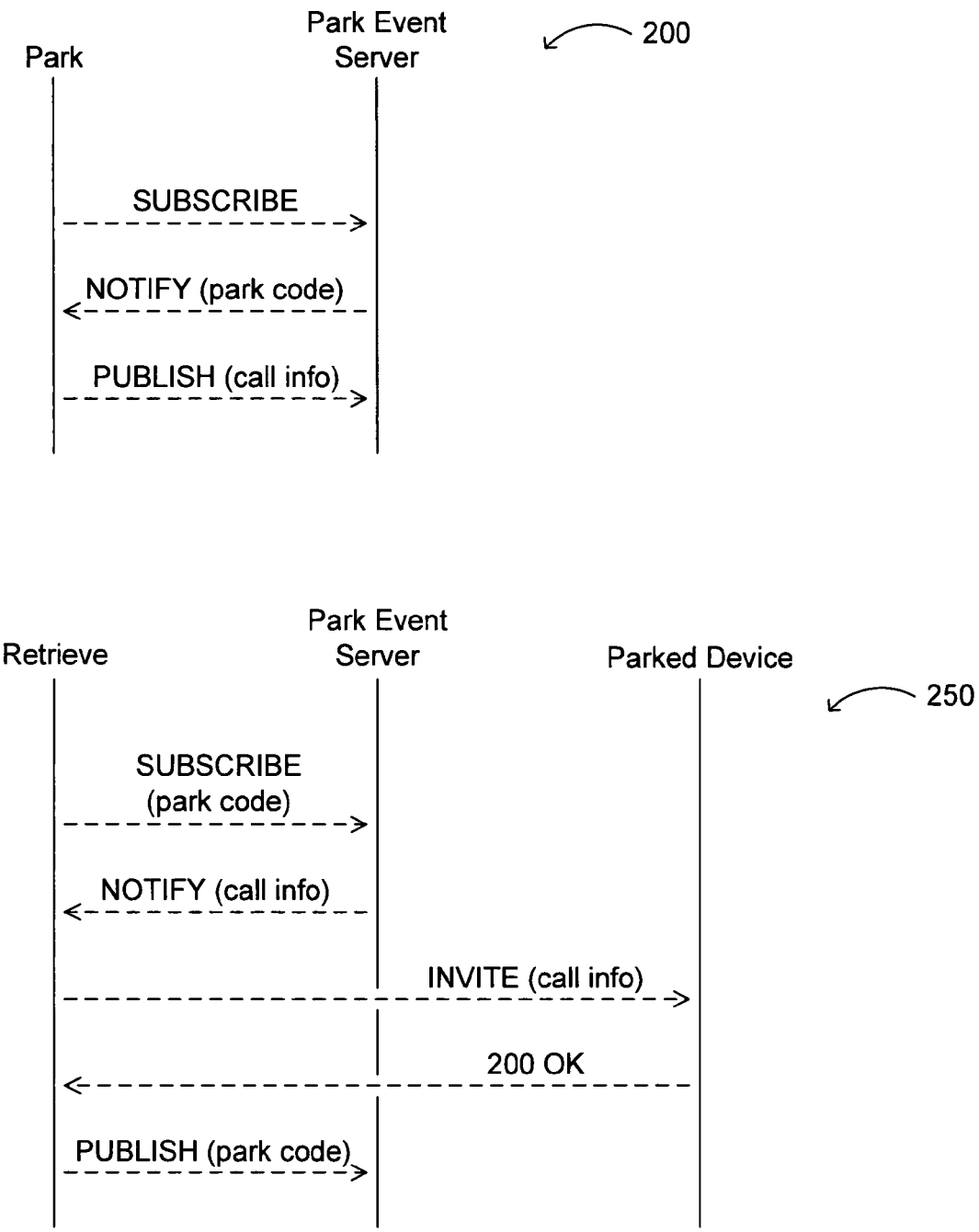
FIG. 2 illustrates example message sequences for parking and retrieving a call.

Referring now to FIG. 2, example message sequences for parking a call (general, reference character 200) and retrieving a call (general reference character 250) are shown. For parking a call: (i) the SIP subscribe message can be sent from the park call phone (e.g., 104 of FIG. 1) to a park event server (e.g., 102 of FIG. 1); (ii) the SIP notify message with a park code can be returned from the park event server to the park call phone; and (iii) the SIP publish message can be sent from the park call phone to the park event server, where the publish message contains call information.

For retrieving a call (see general reference character 250 of FIG. 2): (i) the SIP subscribe message with the park code can be sent from the retrieve call phone (e.g., 106 of FIG. 1) to the park event server; (ii) the SIP notify message with the call information can be sent from the park event server to the retrieve call phone; (iii) the SIP INVITE message with the call information can be sent from the retrieve call phone to a parked device (e.g., phone 108 of FIG. 1); (iv) the SIP OK message (e.g., 200 OK) can be returned from the parked device to the retrieve call phone; and (v) the SIP publish message with the park code can be sent from the retrieve call phone to the park event server to inform the park event server that the call has been retrieved.

Figure 3:
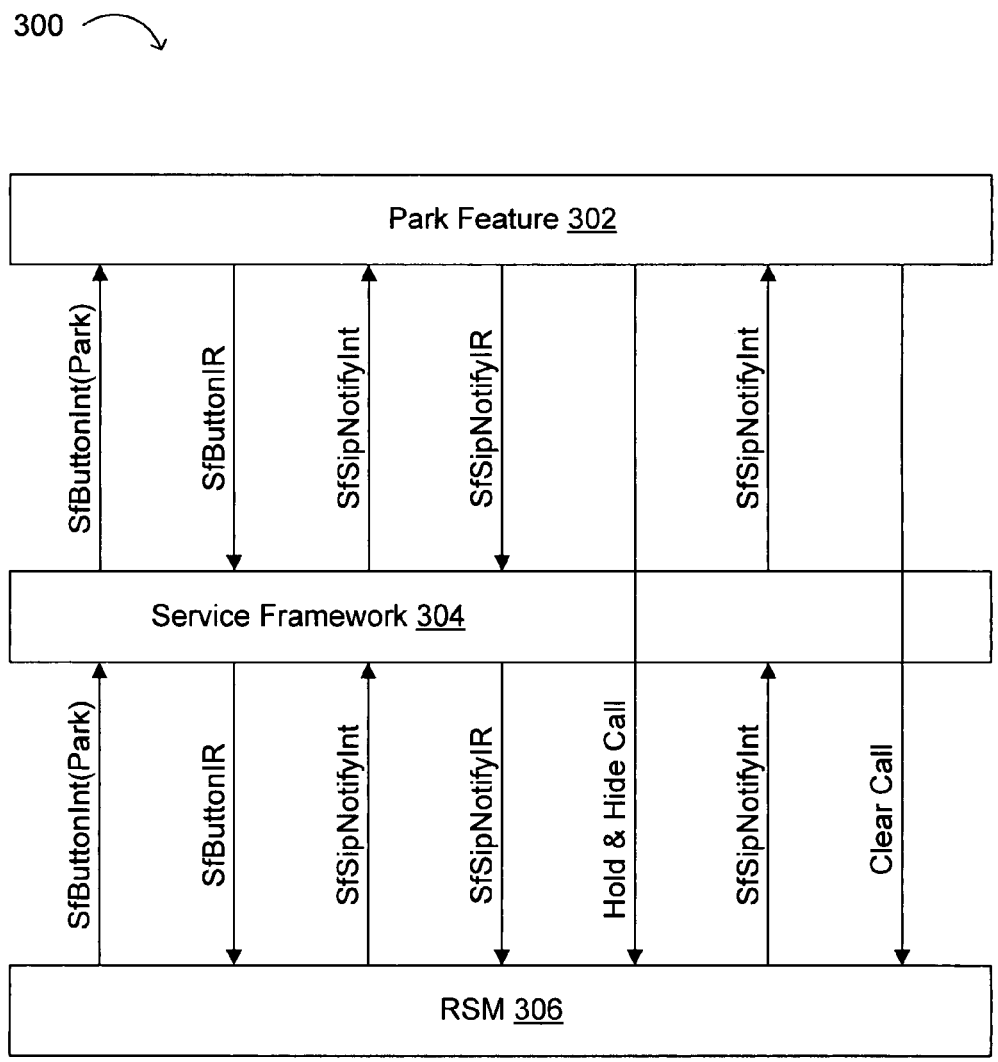
FIG. 3 illustrates an example park call phone structure/operation.

Referring now to FIG. 3, an example park call phone structure/operation is shown and indicated by the general reference character 300. For example, structure 300 can represent park call phone 104 of FIG. 1. In FIG. 3, park feature module 302 can communicate with a software interface (e.g., service framework 304) by, for example, receiving call park intercepts and notification intercept messages, while providing corresponding intercept response messages. Also, routing state machine (RSM) 306 can interface with service framework 304 by, for example, providing call park and notification intercept messages, and receiving corresponding intercept response messages. In addition, park feature 302 can provide hold and hide call, and clear call messages to RSM 306.

In particular embodiments, endpoint feature logic (e.g., park feature 302) can interface with a service framework (e.g., 304), which can provide an abstract software interface to platform call control state machines. Such state machines can allow the feature logic to influence state transition outcomes when events of interest to the feature occur in the system. Feature logic can include facilitation for a sequence of message exchanges that can include intercepts, intercept response/commands, and events. In particular embodiments, this routing of intercepts by platform state machines to feature state machines that have registered an interest in certain call control conditions can provide a feature development mechanism.

Figure 4:
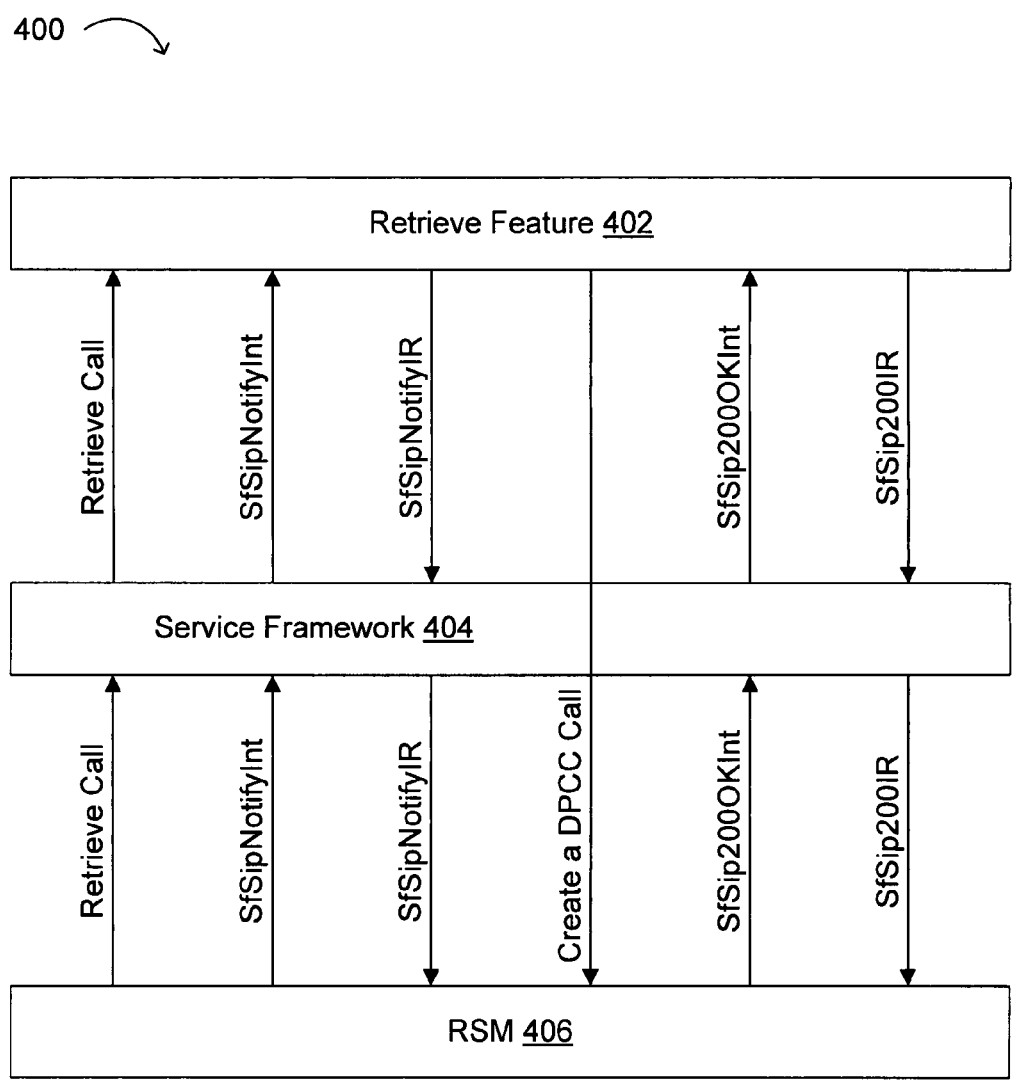
FIG. 4 illustrates an example retrieve call phone structure/operation.

Referring now to FIG. 4, an example retrieve call phone structure/operation is shown and indicated by the general reference character 400. For example, structure 400 can represent retrieve call phone 106 of FIG. 1. In FIG. 4, retrieve feature module 402 can communicate with a software interface (e.g., service framework 404) by, for example, receiving retrieve call intercept and notification intercept messages, while providing corresponding intercept response messages. Also, RSM 406 can interface with service framework 404 by, for example, providing retrieve call intercept and notification intercept messages, and receiving corresponding intercept response messages. In addition, retrieve feature 402 can provide a create a DPCC call message to RSM 406.

Figure 5:
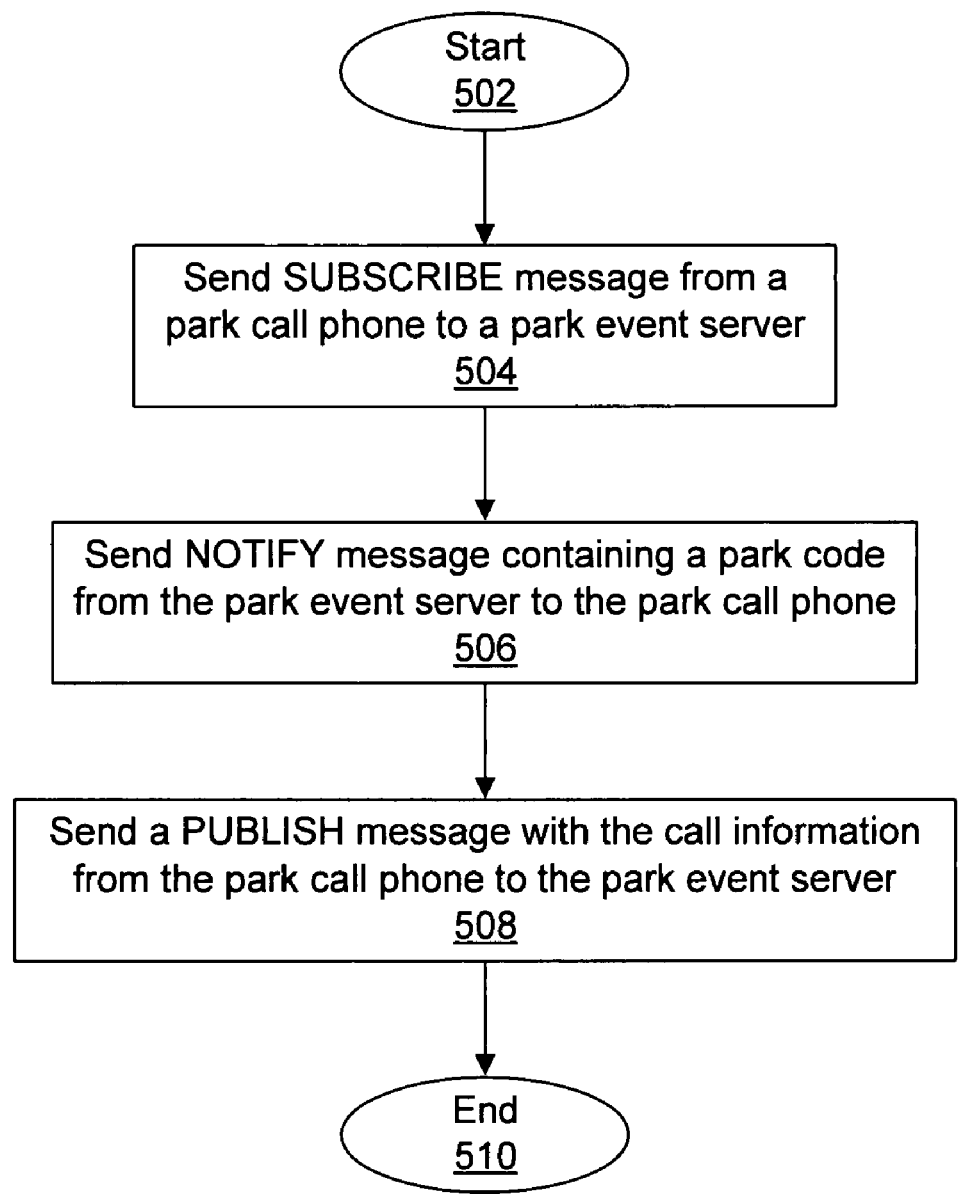
FIG. 5 illustrates a flow diagram for an example method of parking a call.

Referring now to FIG. 5, a flow diagram for an example method of parking a call is shown and indicated by the general reference character 500. The flow can begin (502), and a subscribe message can be sent from a park call phone to a park event server (504). Next, a notify message containing a park code can be sent from the park event server to the park phone (506). Then, a publish message with the call information can be sent from the park call phone to the park event server (508), and the flow can complete (510).

Figure 6:
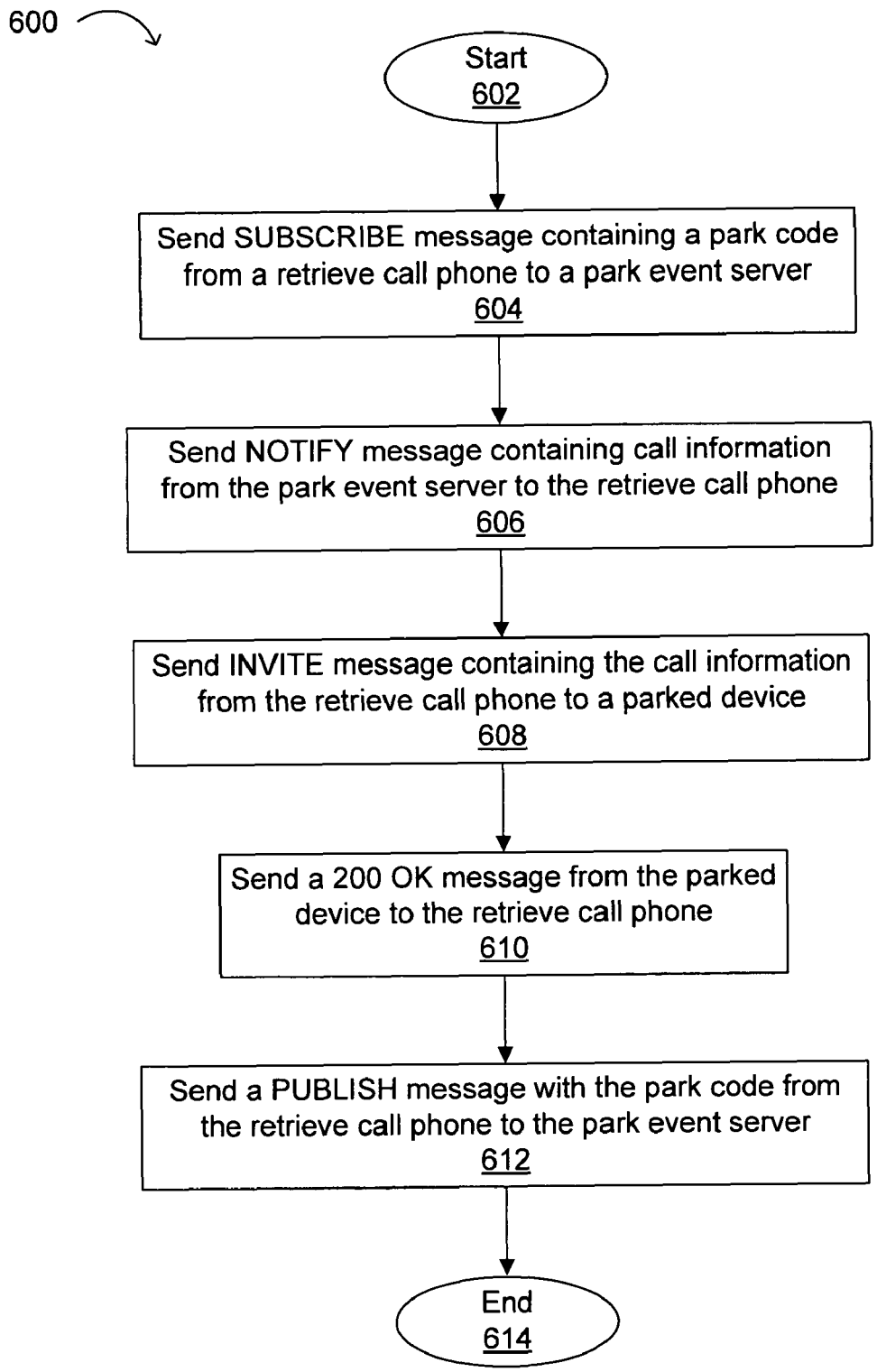
FIG. 6 illustrates a flow diagram for an example method of retrieving a call.

Referring now to FIG. 6, a flow diagram for an example method of retrieving a call is shown and indicated by the general reference character 600. The flow can begin (602), and a subscribe message containing a park code can be sent from a retrieve call phone to a park event server (604). Next, a notify message containing call information can be sent from the park event server to the retrieve call phone (606). Then, an invite message containing the call information can be sent from the retrieve call phone to a parked device (608). Next, a 200 OK message can be sent from the parked device to the retrieve call phone (610). A publish message with the park code can then be sent from the retrieve call phone to the park event server (612), and the flow can complete (614).

Figure 7:
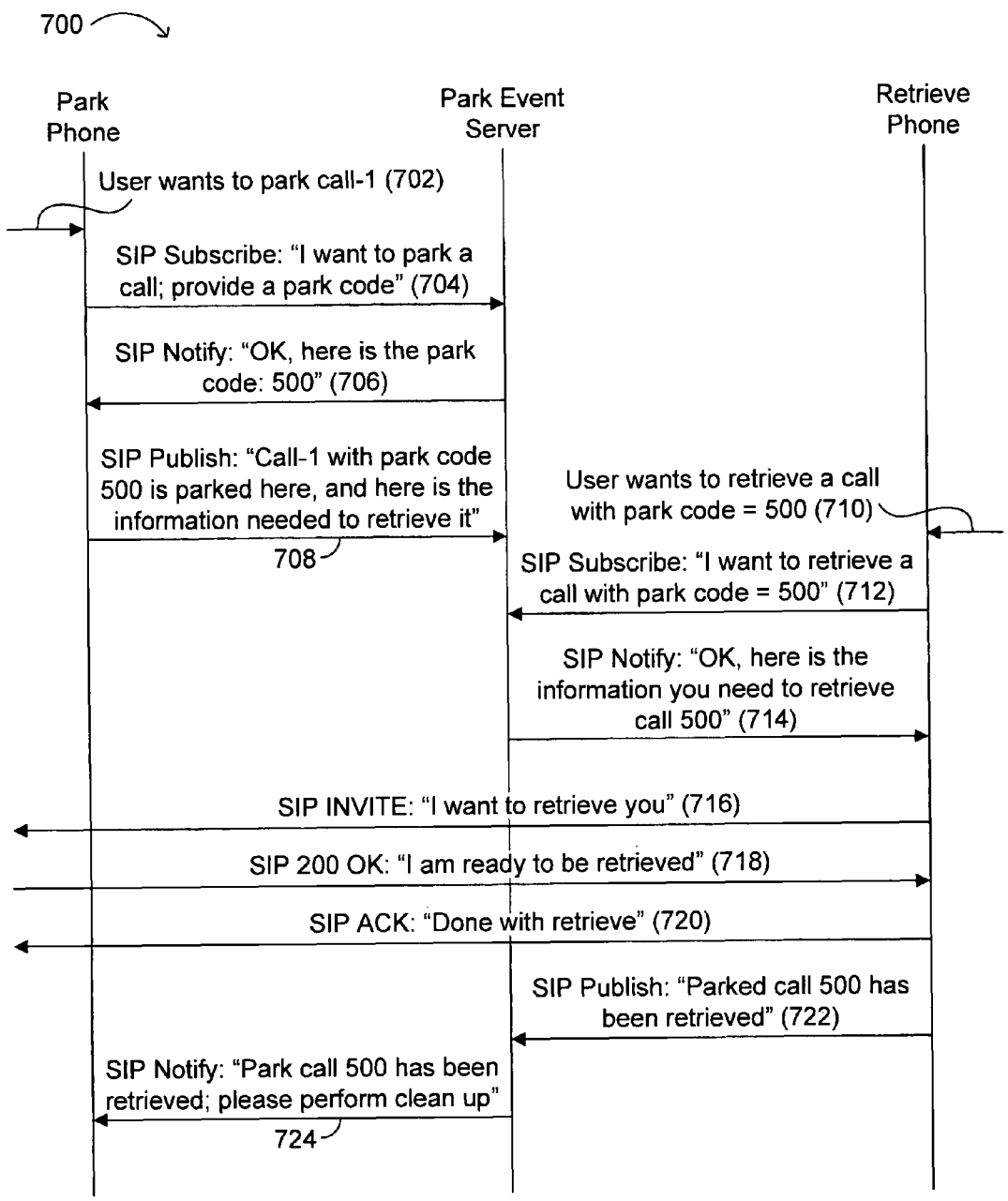
FIG. 7 illustrates an example park feature operation.

Referring now to FIG. 7, an example park feature operation is shown and indicated by the general reference character 700. A user may indicate a desire to park call-1 via a park phone (702). The SIP subscribe message indicating this desire to park a call with the park code can be sent to a park event server (704). Then, the SIP notify message with the park code can be returned from the park event server to the park phone (706). Next, the SIP publish message indicating call-1 with park code (e.g., 500) is parked at a given location, along with the information needed to retrieve the call, can be sent from the park phone to the park event server (708).

A user may indicate that he wants to retrieve a call with park code 500 via a retrieve phone (710). Then, the SIP subscribe message indicating the desire to retrieve a call with park code 500 can be sent from the retrieve phone to the park event server (712). Next, the SIP notify message in response with the information needed to retrieve the call can be returned to the retrieve phone (714). The SIP invite message can then be sent from the retrieve phone (716), with a return message as to being ready for retrieval (718). Next, a retrieve complete SIP message can be sent from the retrieve phone (720). For example, messages 716, 718, and 720 may be sent between the retrieve phone and a parked phone (not shown in FIG. 7, but see, e.g., phone 108 in FIG. 1). Then, the SIP publish message indicating that park call 500 has been retrieved can be sent from the retrieve phone to the park event server (722). The SIP notify message indicating that park call 500 has been retrieved, and requesting cleanup, can then be sent from the park event server to the park phone (724).

Thus in particular embodiments, an event server model can be utilized to allocate/reallocate a park code, and to exchange parked call information. Further, no centralized parking lots may be required in particular embodiments. Also, DPCC may be used to retrieve to call. Accordingly, the SIP subscribe/notify approach may be utilized to deliver a park code to a park event server, where the park event server can maintain the status or state of parked calls, and may further change the state of these calls based upon notifications received from parking or retrieving devices.

Although the description has been described with respect to particular embodiments thereof, these particular embodiments are merely illustrative, and not restrictive. For example, while SIP and DPCC have been described herein, other protocols and/or call control approaches can be used in particular embodiments. Also, while specific commands and structures thereof have been described herein, other commands, message structures and/or types, etc., can also be used in particular embodiments. Further, while particular embodiments described herein utilize DPCC logic running on telephone endpoints, other embodiments can allow the feature logic to be remote from the device at a centralized point. Accordingly, designs are not limited to telephone endpoints, but rather can also be utilized in application appliance arrangements including SIP user agents (UA) with media. Such examples can include voice messaging, auto attendant applications, conference services, as well as any application that may benefit from allowing calls to be parked and retrieved between standard SIP endpoints with minimal basic call signaling capabilities. Finally, particular embodiments can also include multicast signaling for a distributed arrangement, where such signaling may be employed to accomplish a communication sequence between distributed feature logic at the endpoints. Accordingly, the logic described herein may be accomplished using intelligent endpoints in peer-to-peer SIP signaling arrangements, for example.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method executed by a park event server, comprising:
   receiving a first message from a park call phone, wherein the first message comprises a session initiation protocol (SIP) subscribe;
   providing a second message having a park code to the park call phone; and
   receiving a third message having call information from the park call phone.

2. The method of claim 1, wherein the second message comprises SIP notify.

3. The method of claim 1, wherein the third message comprises SIP publish.

4. A method executed by a park event server, comprising:
   receiving a first message having a park code from a retrieve call phone;
   providing a second message having call information to the retrieve call phone;
   forwarding a third message having the park code from the retrieve call phone to a parked device;
   forwarding a fourth message from the parked device to the retrieve call phone; and
   receiving a fifth message having the park code from the retrieve call phone.

5. The method of claim 4, wherein the first message comprises SIP subscribe.

6. The method of claim 4, wherein the second message comprises SIP notify.

7. The method of claim 4, wherein the third message comprises SIP invite.

8. The method of claim 4, wherein the fourth message comprises SIP OK.

9. The method of claim 4, wherein the fifth message comprises SIP publish.

10. An apparatus, comprising:
    a park event server having an interface coupled to a park call phone such that, when performing a park operation, the park event server is configured to:
    receive a first message from the park call phone, wherein the first message comprises a session initiation protocol (SIP) subscribe;
    provide a second message having a park code to the park call phone; and
    receive a third message having call information from the park call phone.

11. The apparatus of claim 10, wherein the second message comprises SIP notify.

12. The apparatus of claim 10, wherein the third message comprises SIP publish.

13. An apparatus, comprising:
    a park event server having an interface coupled to a retrieve call phone such that, when performing a retrieve operation, the park event server is configured to:
    receive a first message having a park code from the retrieve call phone;
    provide a second message having call information to the retrieve call phone;
    forward a third message having the park code from the retrieve call phone to a parked device;
    forward a fourth message from the parked device to the retrieve call phone; and
    receive a fifth message having the park code from the retrieve call phone.

14. The apparatus of claim 13, wherein the first message comprises SIP subscribe.

15. The apparatus of claim 13, wherein the second message comprises SIP notify.

16. The apparatus of claim 13, wherein the third message comprises SIP invite.

17. The apparatus of claim 13, wherein the fourth message comprises SIP OK.

18. The apparatus of claim 13, wherein the fifth message comprises SIP publish.

19. A means for parking and retrieving calls, the means comprising:
    when performing a park operation:
    a means for receiving a first message from a park call phone;
    a means for providing a second message having a park code to the park call phone; and
    a means for receiving a third message having call information from the park call phone; and
    when performing a retrieve operation:
    a means for receiving a fourth message having the park code from a retrieve call phone;
    a means for providing a fifth message having the call information to the retrieve call phone;
    a means for forwarding a sixth message having the park code from the retrieve call phone to a parked device;
    a means for forwarding a seventh message from the parked device to the retrieve call phone; and
    a means for receiving an eighth message having the park code from the retrieve call phone.

* * * * *